United States Patent Office 3,561,910
Patented Feb. 9, 1971

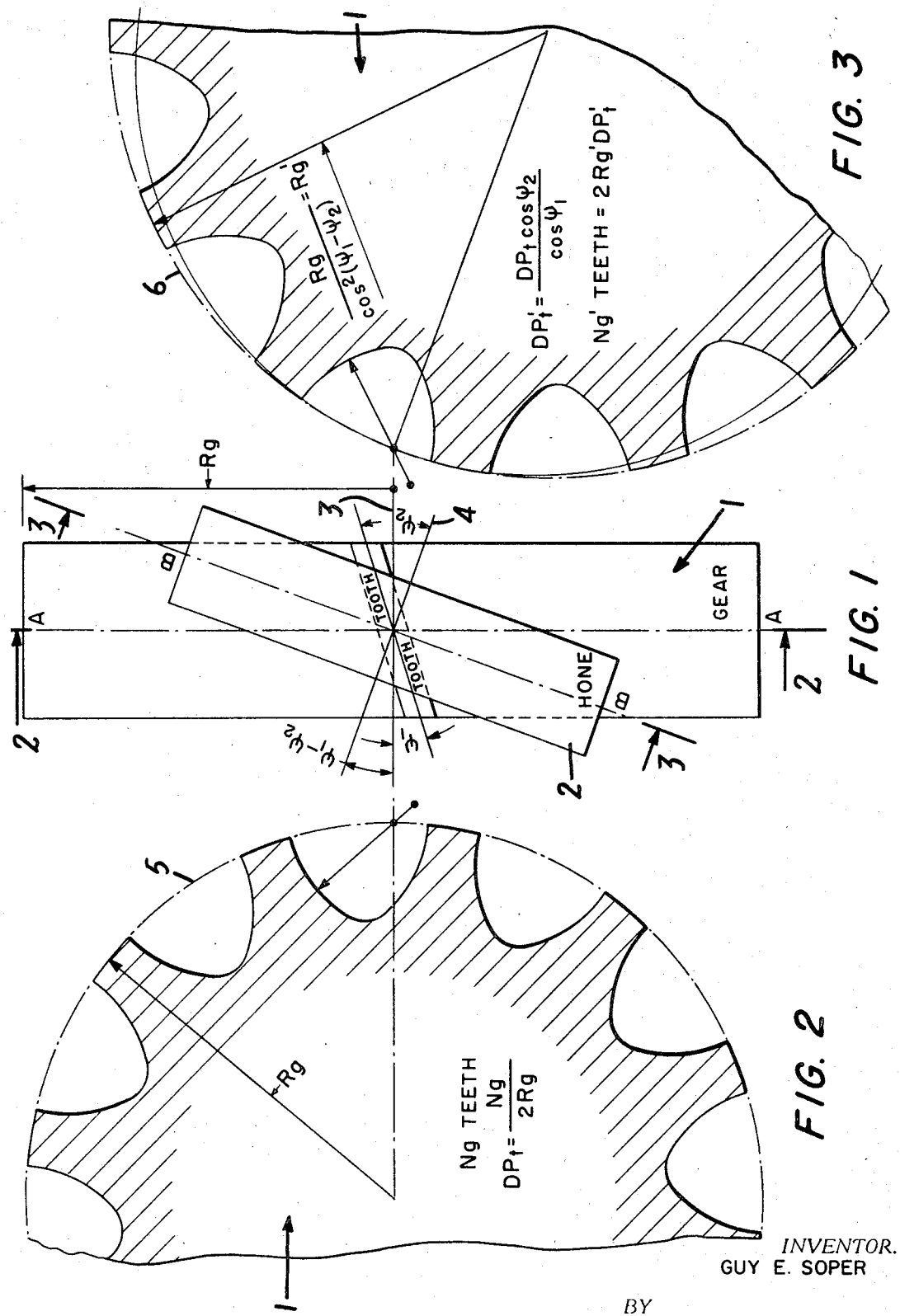

3,561,910
ROLLING CONTACT GEAR HONING METHOD
Guy E. Soper, Williamsport, Md., assignor to Mack Trucks, Inc., Montvale, N.J., a corporation of New York
Filed Nov. 30, 1967, Ser. No. 686,992
Int. Cl. B24b 1/00
U.S. Cl. 51—287                                    2 Claims

ABSTRACT OF THE DISCLOSURE

Honing rolling contact gear members having concave tooth profile shapes wherein a hone tooth shape is designed to operate with said gear member without tooth interference as the hone changes its tooth and diameter sizes due to operational wear.

---

The present invention relates to honing gears and, more particularly, to honing rolling contact gears having concave tooth profiles.

In rolling contact gears, as described in the Soper U.S. Pat. No. 3,371,552 granted Mar. 5, 1968, uniform rotary motion is transmitted from the driving gear to the driven gear by designing the tooth profiles of such gears so that the tooth contact point, staying at a fixed distance from the axes of rotation of the gears throughout the entire tooth engagement, travels in a direction lengthwise of the gear. In order to provide this uniform rotary motion, the teeth of the rolling contact gears must be helical to provide a lead action with a helix overlap. Usually such gears have concave tooth profiles on the gear having the larger number of teeth and convex tooth profiles on the gear having the smaller number of teeth, the tooth profiles being circular arcs of different radii shaped by the generating action of hob tools having curved cutting edges.

To operate rolling contact gears quietly and smoothly and with a minimum of wear, the tooth profiles must be shaped accurately. If the tooth profiles are not accurately shaped, the mating teeth run out of mesh causing the contact point of the gears to shift and the pressure line perpendicular to the tangent to the gear teeth at the contact point no longer passes through the pitch point of the gears. Such gears operate noisily and wear rapidly.

To remove the nicks and roughness produced by the cutting operation and to correct the gear tooth profiles after heat treatment, gear hones of gear-like shape and having a surface coating of a suitable abrasive are operated in mesh with the gears and with a drag imposed on the hone to provide the necessary honing pressure. The hones provided heretofore have not been entirely satisfactory for the reason that their operating life is too limited and due to wear, the hones sometimes bottom in the root of the gear member being honed with resulting damage to the gear.

An object of the present invention is to provide a honing method wherein is employed a hone tooth shape that can allow a change in its size during the hone life, and at the same time permit a reduction in the hone outside diameter to prevent bottoming in the root of the gear being honed.

A further object of the invention is to provide a honing method wherein is employed a hone tooth shape that will not be gauged by the concave profile shape of the gear being honed, as the hone operates with this gear, and as the hone tooth size changes during this operation due to wear, and as the hone outside diameter is reduced because of this hone tooth size change, all resulting in a reduction in the center distance between the hone and gear.

A still further object of the invention is to provide a honing method wherein is employed a hone with a suitable design life to make it economical for honing a rolling contact gear having concave shaped tooth profiles.

In accordance with the present invention, I have provided a method of honing a rolling contact gear using a gear hone having concave shaped tooth profiles which allows its tooth and diameter sizes to change throughout its entire design life without bottoming in the root of the gear being honed and without being gauged by this gear. More particularly, the teeth on both the concave gear and the hone are formed with the tooth profiles formed as circular arcs, the center of which is located on the line passing through the pitch point and the contact point of the gear teeth when the concave gear is in operation with a mating gear having teeth with convex profile shape. In the plane of hone rotation, the operating pitch circle of the hone rolls without slip on the corresponding pitch circle of the gear having concave shaped tooth profiles, the radius of this gear pitch circle being no larger than the radius of the circle that passes through the center of the gear tooth profile curve but equal to or larger than the radius of the gear pitch circle at which the gear operates with its mating gear in the plane of rotation of the mating gear. With this arrangement, no tooth interference will take place if the radius of the gear pitch circle in the plane of hone rotation is within the permitted length when the hone is new and then allowed to reduce to the minimum length as the hone wears in operation.

For a better understanding of the present invention, reference may be had to the accompanying drawings in which:

FIG. 1 is a diagrammatic view of a gear hone used in accordance with the present invention in mesh with a rolling contact gear having concave tooth profile shapes;

FIG. 2 is a view of the gear in plane A—A of FIG. 1;

FIG. 3 is a view of the gear in plane B—B of FIG. 1;

Figure 4:
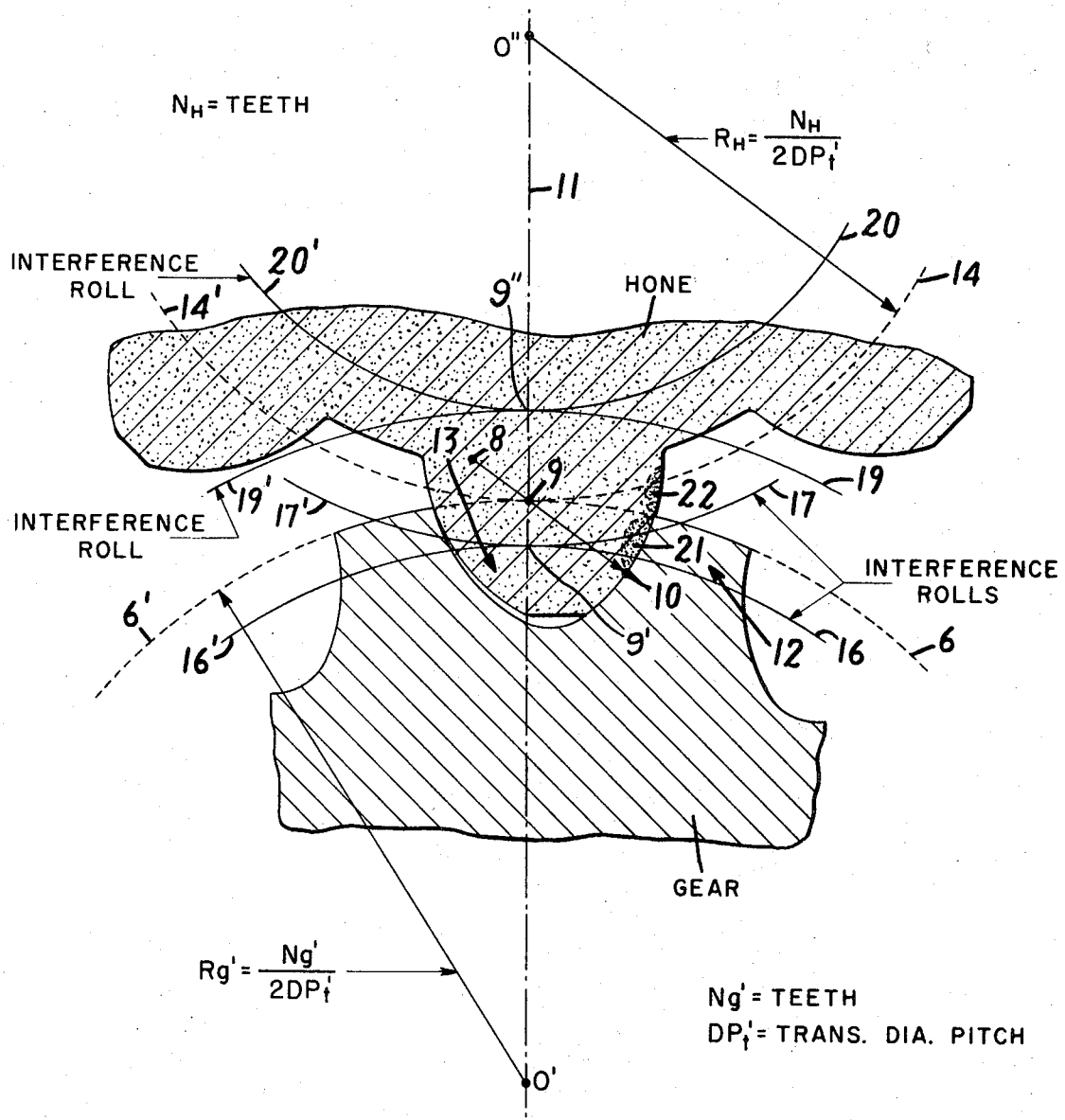
Figure 5:
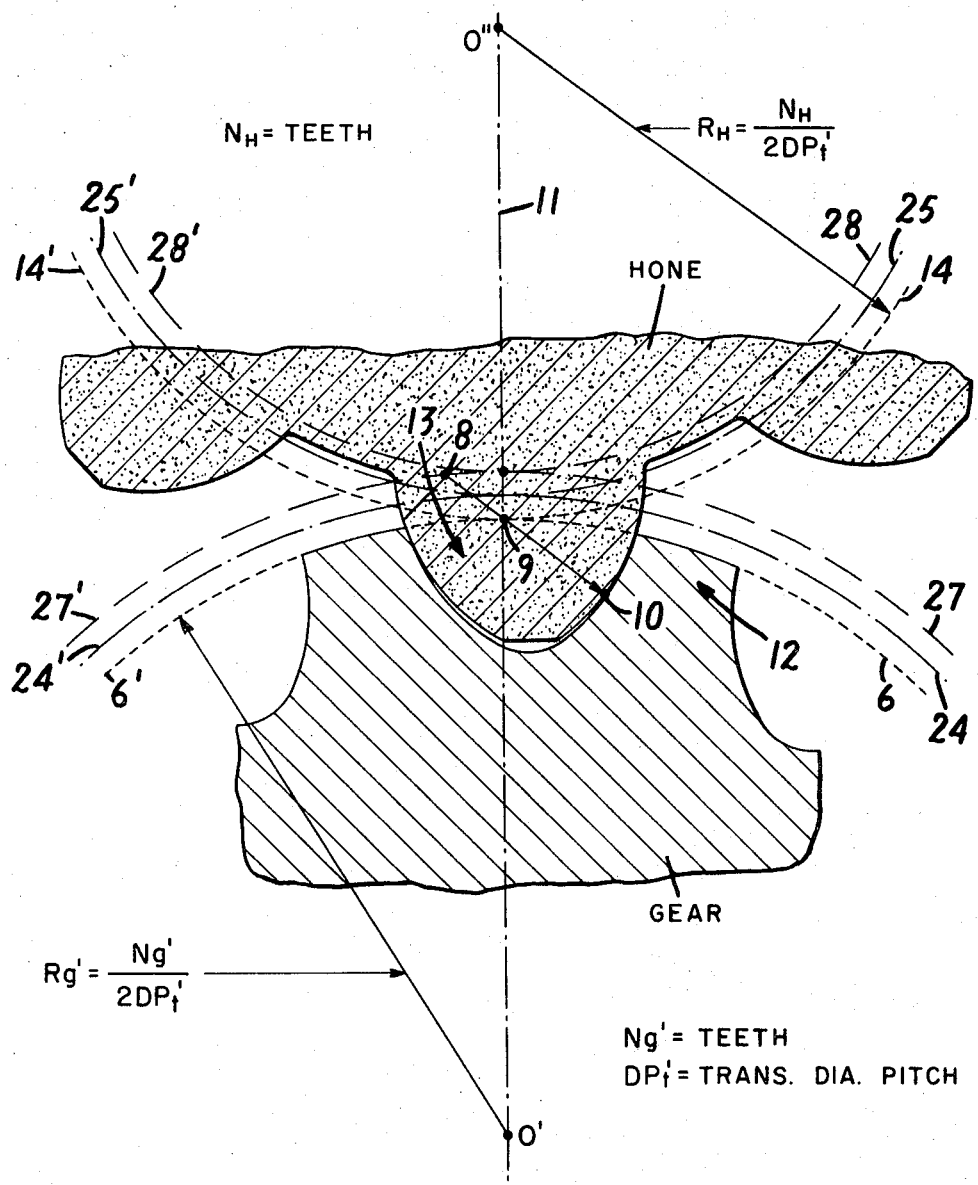

FIG. 4 is a view of a hone tooth in mesh with the gear teeth in the plane B—B of FIG. 1, and different rolling circles are illustrated to show the damaging effect on the hone tooth profiles should the hone roll, without slip, on an incorrect gear circle; and FIG. 5 is a view of a hone tooth in mesh with the gear teeth in the plane B—B of FIG. 1, and different rolling circles are illustrated to show the limited range in the size of these gear rolling circles that can be used without causing a damaging effect on the hone tooth profiles because of this rolling action.

Referring to FIGS. 1–3 gear 1, with axis 3, helix angle $\psi_1$ and plane of rotation A—A engages hone 2, with axis 4, helix angle $\psi_2$ and plane of rotation B—B. In the plane of rotation A—A, the gear has number of teeth $N_g$ and transverse diametral pitch $DP_t$, on pitch circle 5 with a radius $R_g$. Pitch circle 5 rolls, without slip, with the pitch circle of a mating gear (not shown), the mating gear having teeth with convex profile shape. In the plane of rotation B—B the gear has the ellipse as a pitch circle, but the pitch circle 6 is tangent to this ellipse and this circle has pitch radius $R_g'$, with number of teeth $N_g'$, and transverse diametral pitch $DP_t'$.

Referring to FIG. 4 a hone tooth 13 engages a gear tooth 12 on center distance 11, the gear tooth and the hone tooth having centers of rotation at 0' and 0" respectively. The teeth 12 and 13 have curved profiles with a radius of curvature 8–10. Point 8 is the center of tooth profile curvature when this radius passes through pitch point 9. Point 9 is the pitch point when the gear of FIGS. 1, 2 or 3 is in operation with a mating gear (not shown), the mating gear having teeth with convex profile shape. Point 9 is also the pitch point when the gear tooth 12 and the hone tooth 13 engage on the pitch circles 6–6' and 14–14'. Point 10 is the point of contact between the profile arc of gear tooth 12 and the profile arc of a tooth of the mating gear having teeth with convex profile shape with the radius of curvature of this tooth being less than radius 8–10. Contact point 10 is also used as a point of tooth contact between the profile arcs of the gear tooth 12 with the hone tooth 13.

If the pitch circle 6 rolls without slip on pitch circle 14 (which would be the same as holding the hone stationary and moving the gear center 0' to the right so that arc 6–9 rocks without slip arc 14–9), or if the pitch circle 6' rolls without slip on pitch circle 14' (which would be the same as holding the hone stationary and moving the gear center 0' to the left so that the arc 6'–9 rocks without slip upon arc 14'–9), the gear tooth 12 does not interfere with the hone tooth 13 because of this rolling action. If, however, the pitch circle 16 rolls, without slip, on pitch circle 17 (which would be the same as holding the hone stationary and moving the gear center 0' to the right so that arc 16–9' rocks without slip upon arc 17–9'), the gear tooth 12 interferes because of this rolling action with the hone tooth 13 to cause a gauge 22. Likewise, when the pitch circle 19' rolls, without slip, on pitch circle 20' (which would be the same as holding the hone stationary and moving the gear center 0' to the left so that arc 19'–9" rocks without slip upon arc 20'–9"), the gear tooth 12 interferes because of this rolling action with the hone tooth 13 to cause a gauge 21. However, the pitch circle 16' can roll without slip on pitch circle 17' (which would be the same as holding the hone stationary and moving the gear center 0' to the left so that arc 16'–9' rocks without slip upon arc 17'–9'), or the pitch circle 19 can roll without slip on pitch circle 20 (which would be the same as holding the hone stationary and moving the gear center 0' to the right so that arc 19–9" rocks without slip upon arc 20–9"), and there will be no interference of the gear tooth 12 with the hone tooth 13.

FIG. 5 illustrates a typical embodiment of my invention. Here as before, the hone tooth 13 engages the gear tooth 12 on the center distance 11, the gear tooth and the hone tooth having centers of rotation at 0' and 0" respectively. Teeth 12 and 13 have curved profiles with radius of curvature 8–10. Point 8 is the center of tooth profile curvature when this radius passes through the pitch point 9. Pitch point 9 is the pitch point when the gear of FIGS. 1, 2 or 3 is in operation with its mating gear (not shown), the mating gear having teeth with convex profile shape. As stated previously, there is no interference of the gear tooth 12 with the hone tooth 13 when the pitch circle 6–6' rolls, without slip, on the pitch circle 14–14'. I have discovered that there is also no interference of the gear tooth 12 with the hone tooth 13 when the pitch circle 24 rolls without slip, with the pitch circle 25 or when the pitch circle 24' rolls, without slip with the pitch circle 25'.

From the discussion above, it is apparent that the invention has limitations in the amount the pitch circle 24–24' can be outside of the pitch circle 6–6' when the non-interference feature is maintained for the engagement of the gear tooth 12 with the hone tooth 13. If symbol Δ represents the amount the radius of the pitch circle 24–24' is larger than the radius $R_g'$ of the pitch circle 6–6', the non-interference feature of engagement of the gear tooth 12 with the hone tooth 13 is maintained when the size of Δ is limited so that the pitch circle 24–24' is never outside of the pitch circle 27–27'. Pitch circle 27–27' passes through point 8, the center of tooth profile curvature. Thus the invention relates to the condition where the distance 8–10 is larger than 9–10, i.e., the relation wherein the radius of tooth curvature of the tooth 12, distance 8–10, is larger than the distance from the contact point 10 to the pitch point 9. Tooth interference between the gear and the hone is also present when the pitch circle 24–24' is inside the pitch circle 6–6'. In other words, the hone teeth are shaped by the generating action of the gear spaces as this hone is rolled with the gear such that pitch circle 25–25' of the hone rolls, without slip, with the pitch circle 24–24' of the gear, when the pitch circle 24–24' occupies a position between the pitch circles 6–6' and 27–27'.

From the above description a honing method is provided using a tool that will operate with a given gear without tooth interference as the hone changes its tooth and diameter sizes due to operational wear. For example, should the value of Δ be made within the permitted limits when the hone is new and then allowed to reduce to zero as the hone wears in operation, no tooth interference will take place. Thus, the hone can be used throughout its entire design life. It should be noted that the shape of the tooth of the hone will automatically conform to te shape of the average tooth base of the gear as this wear takes place. The preferred arrangement is to limit the size of Δ, when the hone is new, to only the necessary amount required for suitable hone life.

Furthermore, the hone tool may be used for honing gears having concave tooth profiles shaped as arcs of circles in a plane normal to the tooth helix or shaped as arcs of circles in the plane of rotation of the gear, as well as gears having concave tooth profiles shaped as arcs of circles in the plane of rotation of the hone, as illustrated in FIG. 5.

It will be apparent to those skilled in the art that modifications can be made to the present invention without departing from its spirit and scope. Therefore, the invention is not deemed to be limited except as defined in the appended claims.

I claim:

1. A method of honing a rolling contact gear member having concave shaped tooth profiles with a gear hone having convex shaped tooth profiles to shape the concave shaped teeth for mating engagement with the teeth of a mating rolling contact gear member having convex shaped tooth profiles so as to prevent the teeth of the gear hone from bottoming in the root of, and from being gauged by, the gear being honed while the tooth and diameter sizes of the gear hone change due to operational wear, comprising the steps of supporting the gear hone and the rolling contact gear to be honed for rotation in meshing engagement, rotating the gear hone and the gear to be honed so that the concave shaped teeth are honed by the convex shaped teeth of the gear hone, and honing the gear with the gear hone while the tooth and diameter sizes of the gear hone change because of operational wear so long as the pitch circle of the hone rolls without slip on the pitch circle of the gear and so long as the pitch circle of the gear is at least as large as the pitch circle at which the gear operates with its mating rolling contact gear but no larger than the pitch circle passing through the center of hone tooth profile curvature when a radius from this center of curvature passes through the pitch point when the mating rolling contact gears are in engagement and through the contact point between the teeth of the rolling contact gears.

2. A method of preventing interference between the teeth of a gear hone having convex shaped tooth profiles and a rolling contact gear member having concave shaped tooth profiles when the teeth of the rolling contact gear member are honed by the gear hone for mating engagement with the teeth of a mating rolling contact gear member having convex shaped toth profiles while the tooth and diameter sizes of the gear hone change due to operational wear, comprising the steps of supporting the gear hone and the rolling contact gear to be honed for rotation in meshing engagement, rotating the gear hone and the gear to be honed so that the concave shaped teeth are honed by the convex shaped teeth of the gear hone, and limiting the honing action to the condition in which the pitch circle of the hone rolls without slip on the pitch circle of the gear and in which the pitch circle of the gear is at least as large as the pitch circle at which the gear operates with its mating rolling contact gear but no larger than the pitch circle passing through the center of hone tooth profile curvature when a radius from this center of curvature passes through the pitch point when the mating rolling contact gears are in engagement and through the contact point between the teeth of the rolling contact gears.

References Cited

UNITED STATES PATENTS

| | | | |
|---|---|---|---|
| 1,634,863 | 7/1927 | Allen | 51—287 |
| 2,913,858 | 11/1959 | Praeg | 51—206 |
| 2,977,726 | 4/1961 | Daniel | 51—206 |
| 3,085,369 | 4/1963 | Findley | 51—206X |
| 3,206,893 | 9/1965 | Rumbaugh | 51—206 |

FOREIGN PATENTS 864,688  4/1961  Great Britain.

DONALD G. KELLY, Primary Examiner